July 19, 1966     W. H. KING, JR     3,261,202
MOISTURE SENSOR
Filed Jan. 8, 1963     3 Sheets-Sheet 1

William H. King, Jr.     INVENTOR

BY Reuben Miller

PATENT AGENT

July 19, 1966 W. H. KING, JR 3,261,202
MOISTURE SENSOR

Filed Jan. 8, 1963 3 Sheets-Sheet 3

William H. King, Jr. INVENTOR

BY

PATENT AGENT 3,261,202
MOISTURE SENSOR
William H. King, Jr., Florham Park, N.J., assignor to Esso Research and Engineering Company, a corporation of Delaware
Filed Jan. 8, 1963, Ser. No. 250,109
13 Claims. (Cl. 73—53)

This invention relates to the analysis of fluid mixtures. More particularly, it relates to a method and apparatus for analyzing at least one key component of a fluid, e.g. liquid or gaseous mixture, by removing a component from said fluid mixture by means of an adsorbent held in a receptacle, causing the receptacle to oscillate, and then measuring the change in frequency of the receptacle in order to determine the amount of a component which has been adsorbed by the adsorbent. Preferably, the adsorbent is within a container which is part of the receptacle.

The invention can be used to analyze many fluid mixtures; for example, it can be profitably used to analyze for moisture in fluid mixtures. This problem has presented severe obstacles in many varied areas of endeavor. The ever-present problem of moisture in air is well known in industry; the pharmaceutical and frozen food areas have had especially acute difficulties in this area. Slight variations in moisture level, if not rapidly detected, may contaminate these products.

More recently, the problem of moisture within liquid refrigerants has been encountered. Traces of moisture which will rapidly freeze and convert to ice will cause lines transporting the refrigerants to clog and destroy the effectiveness of the system. Here, an analyzer, particularly an analyzer which can measure continuous changes, is needed to detect the moisture within the refrigerant.

Perhaps the most important area, with respect to ultimate consequences, is jet transportation. The presence of moisture in jet fuel has often proved disastrous; at high altitudes moisture will readily freeze. The resulting ice may clog the fuel filters of a jet aircraft and cause a sudden stoppage of substantially all of the aircraft's power.

The invention is not limited to use with fluids containing water, but is equally applicable to any situation where it is desirous to analyze for a component of a fluid mixture.

Several attempts have been made to devise an apparatus which would remove one component from a mixture of fluids.

Early attempts involved highly complex mechanisms which were constantly subjected to mechanical failures. Furthermore, these inventions represented large cumbersome machines which could not be directly connected to a jet fuel line, or made part of a refrigeration system. Recent efforts have been somewhat more compact, but they have still presented serious difficulties; in particular, U.S. Patents 2,952,153 and 2,963,899 have concerned sonic and acoustical analyzers. These inventions have recognized that sound waves will behave differently if the component parts of a gaseous mixture were changed.

This principal is effective if one is desirous of knowing this limited bit of information. However, the systems will not disclose the particular component which is effecting the sound wave. Additionally, and of paramount importance, they do not indicate the quantity of key material which is present.

Thus, the need for an analyzer which is capable of continually identifying the quantity and nature of a component of a fluid mixture is obvious.

According to a preferred embodiment of the present invention, a receptacle having a known frequency and which comprises conduits, a permanent magnet and a container with a selective adsorbent is adapted to receive a fluid, preferably a liquid, which is to be analyzed. The receptacle is so constructed that its frequency may be measured at any time. This can be done by attaching a pickup means to some point on the receptacle; the pickup is, in turn, connected to a frequency meter which supplies continual frequency readings. The phonograph pickup is also connected to an electromagnet which is needed to maintain vibrations.

A continuous or intermittent stream of fluid is brought into the receptacle where it is contacted with the selective adsorbent. In one embodiment of the invention, the adsorbent can be located within the container or in another embodiment, the conduits themselves, thereby eliminating the container from the system since the conduits can easily be made to interconnect.

After suitable contact with the adsorbent has been made, the liquid is removed from the system by a conduit.

The receptacle is then made to vibrate by striking it, in any convenient manner, and this vibration is then received by the phonograph pickup and transmitted as an alternating voltage to the frequency meter where it is measured. The vibration signal can also be amplified and transmitted to an electromagnet opposite the permanent magnet of the receptacle, and the initial vibration thereby maintained. To compensate for irregularities in the amplifier, the vibration signal may pass through a phase shifter before it reaches the electromagnet; it should be noted that the shifter may or may not be required, depending on the characteristics of the system.

The frequency of the receptacle before and after the adsorption of a component of the fluid mixture is compared. The difference in frequency indicates if the particular component to which the adsorbent is selective is present, and also in what quantities for a volume of fluid. Since frequency may be accurately measured, a difference in weight of 0.1% in the sold adsorbent can be easily measured.

It should be noted that many changes may be made without departing from the spirit of this invention. For instance, the magnet may be eliminated; the vibration would not be continuous in that case. However, the frequency can readily be determined by causing the apparatus to vibrate by simple mechanical means. Further, many types of transducers may be employed to detect the vibrations. These include such things as microphones, photocells, contact points, strain gauges, etc. In the case of vibrators whose frequency is between 20 to 15,000 cycles per second, the human ear can serve as the detecting device.

It is an object and advantage of this invention to provide a compact analyzer for determining a component of a fluid mixture.

It is a further object of this invention to provide an analyzer for the determination of the presence of moisture within a fluid mixture.

It is a still further object of this invention to provide an analyzer for the continuous determination of moisture within a fluid mixture.

Other objects and advantages of this invention will become obvious from the following description of the drawings.

Figure 1:
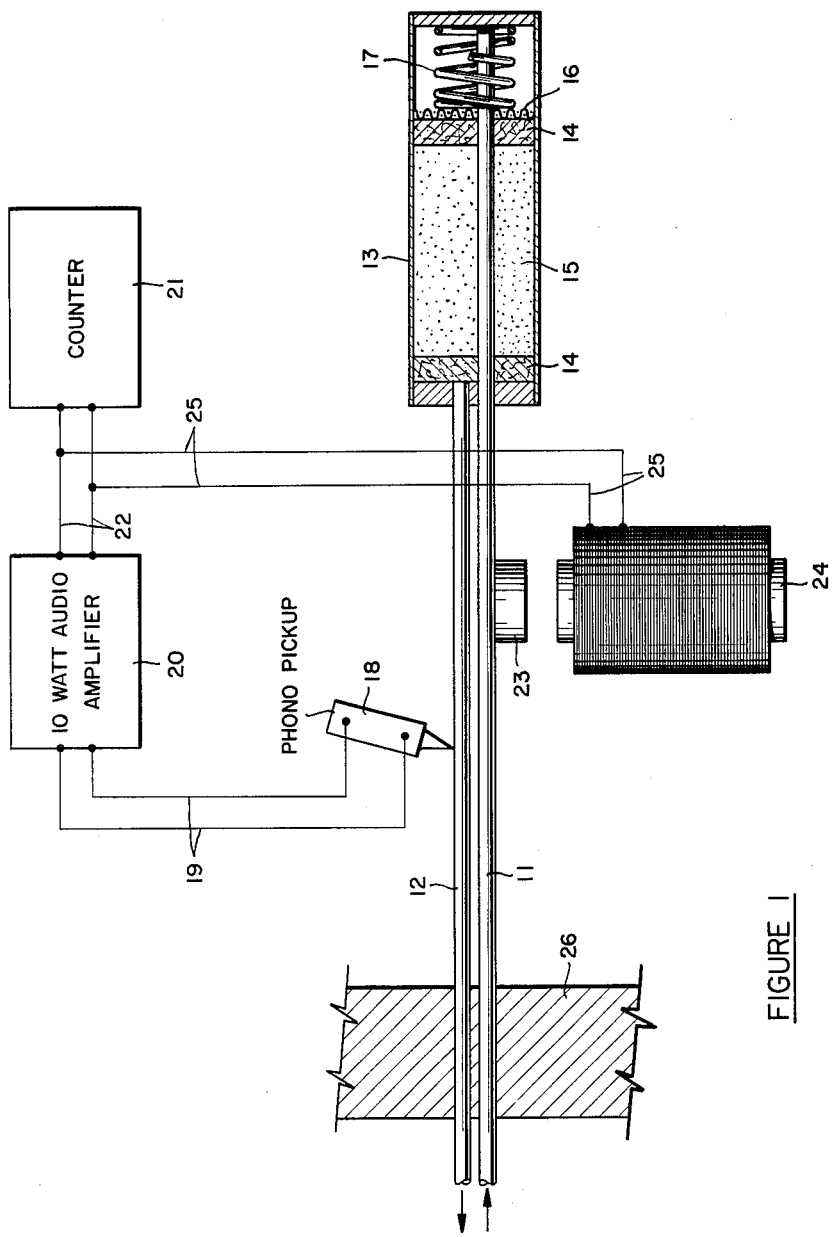
FIG. 1 is an over-all schematic view of a preferred embodiment of this invention.

Referring now to FIG. 1, the reference numeral 11 refers to an inlet tube and 12 is an outlet tube. Numeral 13 refers to a container; inlet conduit 11, outlet conduit 12 and container 13 make up the receptacle for a fluid mixture which is introduced through inlet conduit 11. Within container vessel 13, the following articles are to be found: glass wool 14, Dowex 15 (or a desiccant), a screen 16 and a spring 17. At any point along the receptacle is found a phono pickup 18. The phono pickup 18 is connected by wires 19 to a 10-watt audio amplifier 20. Amplifier 20 is, in turn, connected to Hewlett Packard 522B counter 21 by means of wires 22. The receptacle is supported by support clamp 26. At a point along inlet conduit 11 is permanent magnet 23; maintained opposite magnet 23 is another magnet 24. Magnet 24 is an electromagnet and is joined by wires 25 to wires 22.

Figure 3:
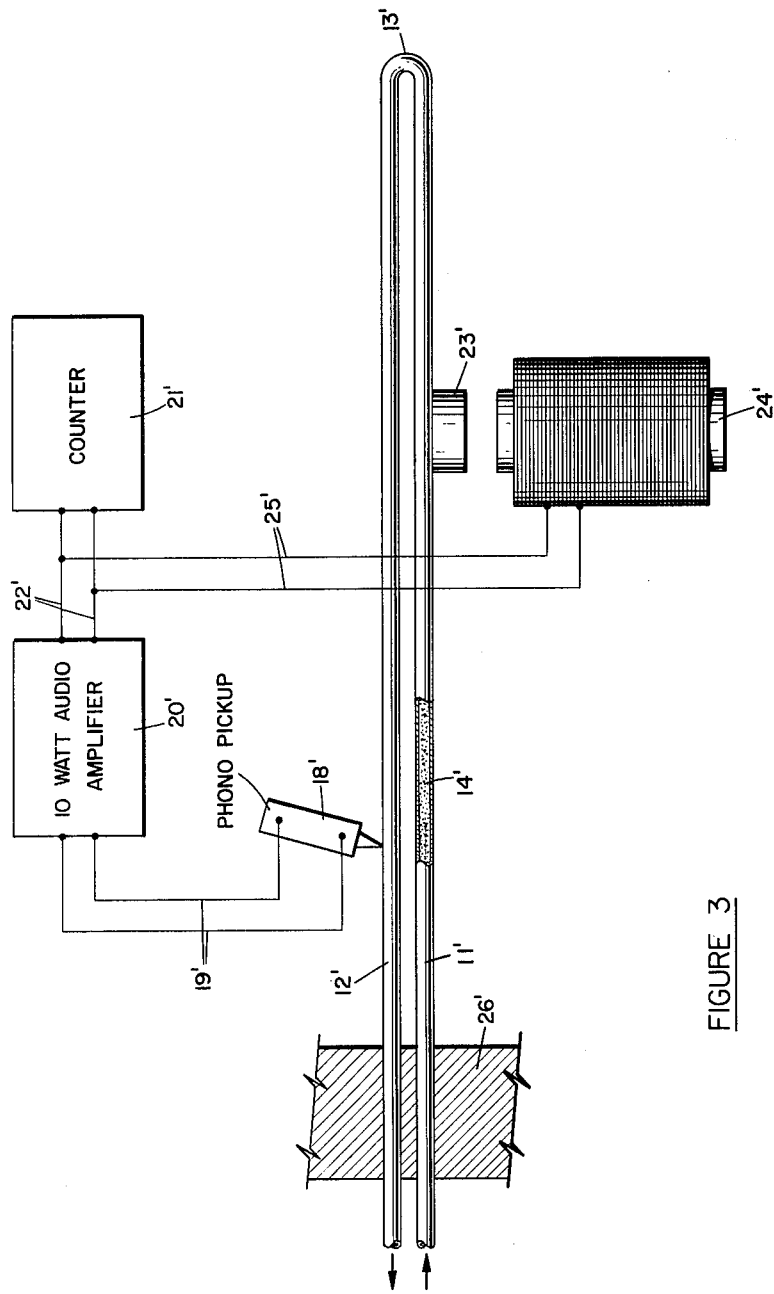
FIGURE 3 is an over-all schematic view of another embodiment of this invention.

A fluid mixture is directed into inlet means 11 and is transported into container 13, at which time any moisture in the mixture is adsorbed by the Dowex 15. It should be emphasized that any component may be adsorbed by replacing the Dowex 15 with a suitable adsorbent and such concept is within the scope of this invention. Additionally, any suitable desiccant, such as silica gel, may be used to adsorb moisture. After the moisture or other component is removed, the gaseous mixture is then directed out of the container 13 by means of outlet conduit 12 and removed from the system entirely. The container 13 is caused to vibrate before the fluid mixture enters by striking it gently. The vibration is received by crystal phono pickup 18 and is transmitted along wires 19 to audio amplifier 20, at which point it is amplified to a desired degree. From the amplifier 20, the vibration is transmitted along wires 22 to counter 21 where the frequency of the receptacle is determined. At the same time, the vibration is transmitted along wires 25 to electromagnet 24. This serves to activate the magnet 24 which, in turn, attracts permanent magnet 23; the attraction between these two magnets serves to maintain the vibration; the vibration changes as moisture is adsorbed by the Dowex bed 15. Referring now to FIGURE 3, the reference numeral 11' refers to an inlet tube and 12' is an outlet tube. Within inlet tube 11' is Dowex 14'. The two tubes 11' and 12' meet at any point 13'. At any point along outlet tube 12' is phono pickup 18'. The phono pickup 18' is connected by wires 19' to a 10-watt audio amplifier 20'. Amplifier 20' is, in turn, connected to Hewlett Packard 522B counter 21' by means of wires 22'. Support clamp 26' supports inlet tube 11' and outlet tube 12'. At a point along inlet tube 11' is permanent magnet 23'; maintained opposite magnet 23' is another magnet 24'. Magnet 24' is an electromagnet and is joined by wires 25' to wires 22'.

A fluid mixture is directed into inlet 11' and is transported around past point 13 and out through outlet line 12'. Any moisture in the mixture is adsorbed by the Dowex 14' which is contained within the inlet line 11'. Inlet conduit 11' and outlet conduit 12' are caused to vibrate before the fluid mixtures by striking gently. The vibration is received by crystal phono pickup 18' and is transmitted along wires 19' to audio amplifier 20', at which point it is amplified to a desired degree. From the amplifier 20', the vibration is transmitted along wires 22' to counter 21' with a frequency of the receptacle is determined. At the same time, the vibration is transmitted along wires 25' to electromagnet 24'. This serves to activate the magnet 24' which, in turn, attracts permanent magnet 23'; the attraction between these two magnets serves to maintain the vibration; the vibration changes as moisture is adsorbed by the Dowex 14' maintained within inlet line 11'.

In a specific example of this invention, the apparatus was first calibrated with known weights to determine if the difference in vibration would properly reflect the difference in weight. After this, a sample of moist air was introduced into an apparatus similar to that of FIG. 1 and the change in vibration period of the receptacle studied.

The moist air was introduced into a 1.75 mm. diameter hypodermic tube, conduit 11 in FIG. 1, which was 3½ inches long. This length was chosen to give a convenient frequency of about 40 c.p.s. The gas was introduced at a rate of 1360 cc./min. at a temperature of 75° F. It was transported into container 13, which was a 1½ inch long brass tube with a diameter of 0.5 inch and a wall thickness of 0.0125 inch. Within the container 13, there was 2.32 grams of dry Dowex 15 which was contained by glass wool 14, screen 16 and spring 17. The Dowex resin used was Dowex 50W–X4, $K^+$ form. The moisture within the air was adsorbed and the air continued out through outlet conduit 12.

At the start of the example, the container 13 was struck to cause it to initiate vibrations. The vibrations were received by phono pickup 18 and the resulting signal transported along wires 19 to 10-watt audio amplifier 20. From the amplifier 20, the vibration signal was transported to counter 21 where the duration of vibration period was measured. For this example, a Hewlett Packard 522B counter was utilized, but other suitable devices will be obvious to one skilled in the art. Concurrently with the vibration signal being transported to the counter 21, it is transported along wires 25 to electromagnet 24. Electromagnet 24 then attracts permanent magnet 23 and perpetuates the vibration. A phase shifter (not shown) may be utilized if needed. This particular setup worked well without one. The period of vibration was 25.898 milliseconds with dry air.

Within the scope of the invention would be the placing of an apparatus, identical to FIG. 1 except that no desiccant or a dummy desiccant is found within container 13, in series with this apparatus. This would serve as a control, and by constantly observing the vibration of this second apparatus, one could calculate any change in vibration period caused by factors other than the adsorption of moisture in the first apparatus. This was not necessary in the specific example since the fluid chosen was air. This was done for convenience and simplicity.

Figure 2:
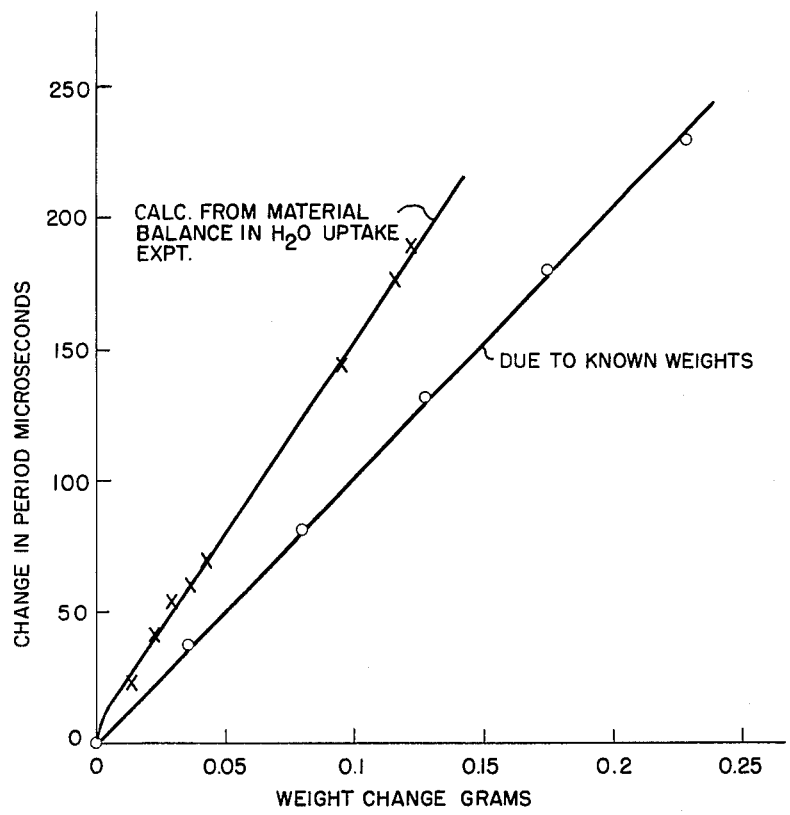
FIG. 2 is a graph comparing the weight change in grams as a function of change in period for known weights and water taken up by a desiccant bed in a preferred embodiment of this experiment.

Analysis of the change in $H_2O$ concentration from inlet to outlet was made by a means of a "Fluid Analyzer" which is described in copending application, U.S. Serial No. 231,971, filed October 22, 1962, at approximately two minute intervals. The analysis could just have easily been made by attaching a small container containing a desiccant to the system and then weighing the desiccant on a microbalance. The loss of water by the stream of air indicates the moisture which was adsorbed by the desiccant. In FIG. 2, a graph was drawn comparing this change in weight with the change in period of vibration in microseconds. The data from which FIG. 2 was prepared are as follows in Table I and II.

TABLE I

| Mg. $H_2O$ adsorbed by desiccant: | Δ period in microseconds |
| --- | --- |
| 13 | 25 |
| 22 | 42 |
| 30 | 55 |
| 36 | 62 |
| 42 | 70 |
| 64 | 100 |
| 95 | 145 |
| 113 | 176 |
| 122 | 188 |

For known weights, under the same conditions as illustrated in the embodiment except air was not blown through the apparatus, the following relationship was obtained:

TABLE II

| Wt. mg. added: | Δ period in microseconds |
| --- | --- |
| 0 | 0 |
| 35 | 38 |
| 78 | 80 |
| 127 | 131 |
| 174 | 180 |
| 227 | 229 |

It is seen that the relationship between known weights and change in vibration period was substantially 1:1. The relationship between the weight gained by the desiccant and change in period was about 1.6:1. This difference may be explained by the fact that the desiccant bed expanded upon taking up additional moisture. When the bed expands, the effective length of the vibrating assembly is increased, which increases the period. It should be noted that in the case of adsorption by molecular sieves, there would be no or little expansion of the bed and the ratio would be substantially 1:1. Thus, it would be within the scope of this invention for a change in period to be caused by the swelling of the adsorbent.

Although the above invention has been described with a certain degree of particularity, it will be understood that numerous changes in details and other modifications can be carried out without departing from the spirit of the invention as hereinafter claimed.

What is claimed is:

1. An analyzer which comprises:
    (1) receptacle means comprising fluid inlet and outlet means and container means;
    (2) adsorbent means within said receptacle means;
    (3) means for producing vibration of said receptacle;
    (4) support means for constraining said receptacle to vibrate in a desired manner;
    (5) measuring means to measure changes in the vibration of the said receptacle means.

2. An analyzer which comprises:
    (1) receptacle means;
    (2) adsorbent means within said receptacle means;
    (3) means to maintain vibration of said receptacle means;
    (4) support means for constraining said receptacle to vibrate in a desired manner;
    (5) measuring means to measure changes in the vibration of said receptacle means.

3. An apparatus for the analyzing of a component of a fluid which comprises in combination:
    (1) inlet and outlet liquid conveying means;
    (2) container means communicating with said inlet and outlet means;
    (3) an adsorbent maintained in said container means communicating with said inlet and outlet means;
    (4) means to maintain vibration in the said inlet and said outlet means and the said container;
    (5) support means for constraining said receptacle to vibrate in a desired manner;
    (6) measurement means to measure changes in the said vibration.

4. The apparatus of claim 3 wherein the component is water.

5. An apparatus for the selective adsorption of water from a liquid hydrocarbon which comprises in combination:
    (1) inlet and outlet liquid conveying means;
    (2) container means continuous with said inlet and outlet means;
    (3) a desiccant maintained in said container means continuous with said inlet and outlet means;
    (4) means to maintain vibration in the said inlet means, said outlet means and the said container;
    (5) support means for constraining said receptacle to vibrate in a desired manner;
    (6) measurement means to measure changes in the said vibration.

6. An apparatus for the selective adsorption of water from a liquid hydrocarbon which comprises in combination:
    (1) a fluid carrying conduit;
    (2) a desiccant maintained in the said fluid carrying conduit;
    (3) means to maintain vibration in the said fluid carrying conduit;
    (4) measurement means to measure changes in the said vibration.

7. An analyzer for the selective adsorption and determination of a component of a liquid mixture which comprises:
    (1) fluid inlet and outlet means maintained substantially parallel and adjacent;
    (2) containing means having an enclosed adsorbent continuous with said inlet and outlet means;
    (3) means for producing a vibration in said containing means;
    (4) pickup means to receive vibration from the said inlet, outlet and container means;
    (5) support means for constraining said receptacle to vibrate in a desired manner;
    (6) measurement means to measure changes in the said vibration.

8. The analyzer of claim 7 where the measuring means is a frequency meter.

9. The analyzer of claim 8 where the component is water.

10. Analyzer for the selective adsorption of a key element from a fluid mixture which comprises in combination:
    (1) substantially parallel and adjacent fluid inlet and outlet means with attached permanent magnetic means;
    (2) container means having an enclosed adsorbent continuous with said inlet and outlet means;
    (3) support means for said inlet and outlet means;
    (4) means for producing vibration of said container;
    (5) pickup means;
    (6) an audioamplifier receiving the said vibration from said pickup means;
    (7) a phase shifter regulating the said vibrations;
    (8) a frequency meter to measure changes in the said vibrations;
    (9) a magnetic coil maintained in spaced relation opposite said permanent magnet, thereby maintaining said vibrations.

11. An improved method for measuring the amount of a selected component present in a fluid mixture comprising measuring the vibration of a receptacle containing an adsorbent bed selective to said component, passing a fluid mixture containing said component through said adsorbent bed containing receptacle, vibrating said adsorbent bed and measuring the frequency change in said vibrations due to the adsorption of said component.

12. Process of claim 11 wherein the said fluid mixture is air and the said component is moisture.

13. Process of claim 11 wherein the said mixture is a liquid hydrocarbon and the said component is moisture.

References Cited by the Examiner
UNITED STATES PATENTS

| | | | |
|---|---|---|---|
| 1,535,538 | 4/1925 | Maxfield et al. | |
| 1,602,213 | 10/1926 | Robbins | 73—76 |
| 2,571,171 | 10/1951 | Van Dyke | 73—29 X |
| 2,694,310 | 11/1954 | Pounds | 73—67 |
| 2,943,476 | 7/1960 | Bernstein | 73—32 |
| 2,970,468 | 2/1961 | Price | 73—53 |
| 3,164,004 | 1/1965 | King | 73—23 |

RICHARD C. QUEISSER, *Primary Examiner.*

JOSEPH P. STRIZAK, J. W. MYRACLE,
*Assistant Examiners.*